United States Patent Office 3,254,718
Patented June 7, 1966

3,254,718
ACIDIZING SUBTERRANEAN FORMATIONS
Peggy M. Dunlap, Dallas, Tex., assignor to Socony Mobil Oil Company, Inc., a corporation of New York
No Drawing. Filed May 15, 1963, Ser. No. 280,726
17 Claims. (Cl. 166—42)

This invention relates to the acid treatment of subterranean formations and relates more particularly to a method for improving the effect of acid treatment of a subterranean formation containing petroleum in improving the rate of recovery of the petroleum from the formation.

Many subterranean formations contain petroleum. The recovery of petroleum from a subterranean formation is effected by flowing the petroleum from the formation into a well leading thereto from the surface of the earth and then removing the oil from the well. The rate at which the petroleum flows into the well from the formation depends upon various factors and one of these factors is the permeability of the formation.

Various methods have been proposed to increase the permeability of the formation in order to increase the rate of flow of the petroleum into the well. A method commonly employed to increase the permeability of a calcareous formation involves passing a solution of an acid into the formation from the well leading to the formation. The acid reacts with the material of the formation to effect solution of a portion of the material. As a result, the interstices within the formation are increased in size and the permeability of the formation is thereby increased. However, while this method has been effective for the purposes intended, it is attended by various drawbacks. For example, the solution of acid passed into the formation reacts with residual petroleum within the formation to produce an emulsion which operates to reduce the permeability of the formation and thus counteracts the effect of the acid solution. Additionally, in formations which are oil-wet, the film of oil adhering to the walls of the interstices of the formation interferes with the contact of the acid solution with the material of the formation. Further, where the formation has a low permeability to the acid solution, excessively high pressures are required to effect a satisfactory rate of passage of the acid into the formation. In addition to these drawbacks, ineffective acidizing is frequently encountered as the result of dilution of the acid solution by the water contained along with the petroleum within the formation.

It is an object of this invention to increase the rate of production of petroleum from a subterranean calcareous formation containing petroleum. It is another object of this invention to improve the permeability of a subterranean calcareous formation containing petroleum to a solution of acid passed into the formation for increasing the rate of production of petroleum from the formation. It is another object of this invention to provide a method for pretreating a subterranean calcareous formation preparatory to treatment with an acid in order to make the acid treatment more effective from the standpoint of increasing the permeability of the formation. It is another object of this invention to minimize the production of emulsions in the acid treatment of a subterranean calcareous formation containing petroleum. It is another object of this invention to improve the wettability of a subterranean calcareous formation containing petroleum to an aqueous solution of acid. These and other objects of the invention will become apparent from the following detailed description.

In accordance with the invention, a subterranean calcareous formation is treated by a method which involves as its essential steps (a) passing into the formation from a well leading thereto an amphipathic solvent, (b) thereafter passing into the formation behind said amphipathic solvent an aqueous solution of an acid, (c) subsequently discontinuing passage of the aqueous solution of acid into said formation and permitting reaction of the aqueous solution of acid with the material of the formation, and (d) lastly flowing petroleum from said formation into the well leading to the formation.

In the process of the invention, the first step involving passage of the amphipathic solvent into the formation from the well leading to the formation achieves a number of desirable results. The amphipathic solvent entering the formation displaces and drives before it the petroleum, and water, contained in the formation. The petroleum, and water, contained in the portion of the formation invaded by the amphipathic solvent is thereby replaced by the amphipathic solvent. As a result, the formation in the vicinity of the well no longer contains petroleum to form an emulsion with the solution of acid subsequently injected. Further, by substitution of the petroleum by the amphipathic solvent, the portion of the formation invaded by the amphipathic solvent is reduced with respect to its wettability to oil and increased with respect to its wettability to water. The solution of acid entering the formation in the subsequent step is able without difficulty to displace the amphipathic solvent. Moreover, the walls of the interstices of the formation are readily contacted by the aqueous solution of acid. Thus, not only is the permeability of the formation to the acid solution increased but the ability of the acid solution to contact the walls of the interstices is also increased.

By amphipathic solvent is meant a solvent which is at least partially miscible with petroleum in the formation or with a solvent for petroleum and which is at least partially miscible with water. Various types of amphipathic solvents may be employed in the practice of the invention. For example, butyl Cellosolve (ethylene glycol monobutyl ether), butyl Carbitol (diethylene glycol monobutyl ether), 1-butanol, 2-butanol, 1-pentanol, 2-pentanol, acetone, methylethyl ketone, dioxane, ethyl alcohol, n-propanol, isopropanol, or diacetone may be employed. Preferably, butyl Cellosolve is employed. Mixtures of two or more amphiphatic solvents may be also employed. Where mixtures are employed, a mixture may be obtained which is best suited from the standpoint of miscibility with the petroleum in the formation or with a solvent for petroleum and miscibility with the aqueous acid passed into the formation.

The amount of amphipathic solvent to be passed into the formation will vary according to the radial distance from the well that the formation is to be acidized. This distance may be as great as 15 feet from the well. In most cases, however, this distance will not exceed about 10 feet from the well. Additionally, the amount of amphipathic solvent will vary depending upon the extent to which the petroleum, and water, in the formation is to be displaced. Satisfactory results are ordinarily obtained where the amount of the amphipathic solvent employed is between about 1 percent and about 10 percent of the hydrocarbon pore volume of the portion of the formation to be acidized. However, amounts of amphipathic solvent in excess of 10 percent of the hydrocarbon pore volume may be employed. These larger amounts would be employed particularly where it is desired to prevent fingering of the solution of acid through the bank of amphipathic solvent as a result of premature thinning of the bank by radial extension.

The solution of acid employed may be any of the aqueous solutions of acid commonly employed for acidizing subterranean calcareous formations. For example, the solution of acid may be an aqueous solution of hydrochloric acid. Commonly, the aqueous solutions of hydrochloric acid employed for acidizing subterranean calcareous formations contain between 5 and 25 percent by weight of hydrogen chloride. An aqueous solution of nitric acid may be also employed. Additionally, an aqueous solution of formic acid may be employed. As is known, as the acid solution becomes spent as the result of reaction with the material of the formation, the solubility of calcium sulfate, i.e., anhydrite or gypsum, dissolved in the acid decreases. Thus, any calcium sulfate dissolved from the formation or derived from the water employed in preparing the solution of acid can precipitate with consequent decrease in the permeability of the formation. Accordingly, it is preferred that the solution of acid is employed contain an agent to inhibit the precipitation of calcium sulfate. Thus, where hydrogen chloride is employed, the solution thereof may contain up to 40 weight percent by weight of calcium chloride. Additionally, the solution of acid may also contain any of the commonly employed inhibitors for prevention of corrosion of metal equipment such as casing, liner, or tubing in the well.

The amount of solution of acid to be employed will vary according to the radial distance from the well to which the formation is to be acidized and, as stated, this distance may vary up to 15 feet but will not, in most cases, exceed about 10 feet from the well. The amount of solution of acid to be employed will also vary according to the extent to which the material of the formation is to be dissolved. Preferably, the amount of acid should be one hydrocarbon pore volume of the portion of the formation to be acidized. However, lesser amounts may be employed. Generally, the amount employed will be that ordinarily employed in conventional, commercial acidizing operations.

In a preferred embodiment of the invention, a hydrocarbon solvent for the petroleum in the formation is passed into the formation prior to the amphipathic solvent. The hydrocarbon solvent passed into the formation will have miscibility with the petroleum contained within the formation. Further, the solvent will have miscibility with the amphipathic solvent thereafter injected into the formation. Thus, the hydrocarbon solvent, upon passage into the formation, will displace the petroleum from the formation and will occupy the space previously occupied by the petroleum. This solvent will thereafter be displaced from its position within the formation by the amphipathic solvent passed into the formation. A particular advantage of passing the hydrocarbon solvent into the formation prior to the amphipathic solvent is that the petroleum is more readily and more nearly completely removed from the formation and replaced by the amphipathic solvent.

The hydrocarbon solvent for the petroleum in the formation is preferably a fraction of crude oil which contains a relatively large amount of aromatic hydrocarbons. A suitable fraction of this sort is a catalytic reformate or a cycle stock from thermal or catalytic cracking of a gas-oil fraction. The hydrocarbon solvent may be a virgin naphtha or gas-oil fraction. It may also be a crude oil having a high gravity. The solvent may also be an aromatic fraction obtained as a product of the carbonization of coal or may be benzene or an alkyl benzene such as toluene, xylene, trialkyl substituted benzene, or tetra alkyl substituted benzene. In general, the hydrocarbon solvent should boil in the range between 80° and 250° C. and should have a viscosity not above 350 Saybolt Universal seconds at 100° F.

The amount of the hydrocarbon solvent for petroleum passed into the formation should be in the range between about 1 percent and 20 percent of the hydrocarbon pore volume of the portion of the formation to be acidized.

Having thus described my invention, it will be understood that such description has been given by way of illustration and example and not by way of limitation, reference for the latter purpose being had to the appended claims.

What is claimed is:

1. In the process of acidizing a subterranean calcareous formation containing petroleum to increase the rate of flow of petroleum therefrom wherein an aqueous solution of an acid is passed into at least a portion of said formation, the improvement comprising passing into said portion of said formation immediately prior to said aqueous solution of an acid an amphipathic solvent, whereby said petroleum and any water contained in said portion of said formation is replaced by said amphipathic solvent and the permeability of said portion of said formation to said aqueous solution of an acid and the ability of said aqueous solution of an acid to contact the walls of the interstices of said portion of said formation is increased.

2. The process of claim 1 wherein said amphipathic solvent is passed into said portion of said formation in an amount between about 1 and 10 percent of the hydrocarbon pore volume of said portion of said formation.

3. The process of claim 1 wherein said amphipathic solvent is ethylene glycol monobutyl ether.

4. A process for the treatment of a subterranean calcareous formation containing petroleum to increase the rate of production of said petroleum from said formation comprising:
  (a) passing into at least a portion of said formation an amphipathic solvent whereby said petroleum and any water contained in said portion of said formation is replaced by said amphipathic solvent and the permeability of said portion of said formation to an aqueous solution and the ability of an aqueous solution to contact the walls of the interstices of said portion of said formation is increased,
  (b) immediately thereafter passing into said portion of said formation an aqueous solution of an acid, and
  (c) thereafter producing petroleum from said formation.

5. The process of claim 4 wherein said amphipathic solvent is passed into said portion of said formation in an amount between about 1 and 10 percent of the hydrocarbon pore volume of said portion of said formation.

6. The process of claim 4 wherein said amphipathic solvent is ethylene glycol monobutyl ether.

7. A process for the treatment of a subterranean calcareous formation containing petroleum to increase the rate of production of said petroleum from said formation comprising:
  (a) passing a solvent for petroleum into at least a portion of said formation whereby said petroleum contained in said portion of said formation is replaced by said solvent for petroleum,
  (b) immediately thereafter passing into said portion of said formation an amphipathic solvent whereby said solvent for petroleum and any water contained in said portion of said formation is replaced by said amphipathic solvent and the permeability of said portion of said formation to an aqueous solution and the ability of an aqueous solution to contact the walls of the interstices of said portion of said formation is increased,
  (c) immediately thereafter passing into said portion of said formation an aqueous solution of an acid, and
  (d) thereafter producing petroleum from said formation.

8. The process of claim 7 wherein said solvent for petroleum is passed into said portion of said formation in an amount between about 1 and 20 percent of the hydrocarbon pore volume of said portion of said formation and said amphipathic solvent is passed into said portion of said formation in an amount between about 1 and 10 percent of the hydrocarbon pore volume of said portion of said formation.

9. The process of claim 7 wherein said solvent for petroleum is an aromatic hydrocarbon solvent.

10. The process of claim 9 wherein said aromatic hydrocarbon solvent boils in the range between 80° and 250° C. and has a viscosity not above 350 Saybolt Universal seconds at 100° F.

11. The process of claim 7 wherein said amphipathic solvent is ethylene glycol monobutyl ether.

12. In the process of acidizing a subterranean calcareous formation containing petroleum to increase the rate of flow of petroleum therefrom wherein an aqueous solution of an acid is passed into said formation, the improvement comprising passing into at least a portion of said formation immediately prior to said aqueous solution of an acid a mixture of at least two amphipathic solvents, whereby said petroleum and any water contained in said portion of said formation is replaced by said mixture of amphipathic solvents and the permeability of said portion of said formation to said aqueous solution of an acid and the ability of said aqueous solution of an acid to contact the walls of the interstices of said portion of said formation is increased.

13. The process of claim 12 wherein said mixture of amphipathic solvents is passed into said portion of said formation in an amount between about 1 and 10 percent of the hydrocarbon pore volume of said portion of said formation.

14. A process for the treatment of a subterranean calcareous formation containing petroleum to increase the rate of production of said petroleum from said formation comprising:
 (a) passing into at least a portion of said formation a mixture of at least two amphipathic solvents whereby said petroleum and any water contained in said portion of said formation is replaced by said mixture of amphipathic solvents and the permeability of said portion of said formation to an aqueous solution and the ability of an aqueous solution to contact the walls of the interstices of said portion of said formation is increased,
 (b) immediately thereafter passing into said portion of said formation an aqueous solution of an acid, and
 (c) thereafter producing petroleum from said formation.

15. The process of claim 14 wherein said mixture of amphipathic solvents is passed into said portion of said formation in an amount between about 1 and 10 percent of the hydrocarbon pore volume of said portion of said formation.

16. A process for the treatment of a subterranean calcareous formation containing petroleum to increase the rate of production of said petroleum from said formation comprising:
 (a) passing a solvent for petroleum into at least a portion of said formation whereby said petroleum contained in said portion of said formation is replaced by said solvent for petroleum,
 (b) immediately thereafter passing into said portion of said formation a mixture containing at least two amphipathic solvents whereby said solvent for petroleum and any water contained in said portion of said formation is replaced by said mixture of amphipathic solvents and the permeability of said portion of said formation to an aqueous solution and the ability of an aqueous solution to contact the walls of the interstices of said portion of said formation is increased,
 (c) immediately thereafter passing into said portion of said formation an aqueous solution of an acid, and
 (d) thereafter producing petroleum from said formation.

17. The process of claim 16 wherein said mixture of amphipathic solvents is passed into said portion of said formation in an amount between about 1 and 10 percent of the hydrocarbon pore volume of said portion of said formation.

References Cited by the Examiner

UNITED STATES PATENTS

| | | | |
|---|---|---|---|
| 2,246,726 | 6/1941 | Garrison | 166—42 |
| 2,379,561 | 7/1945 | Bennett | 166—42 |
| 2,782,859 | 2/1957 | Garst | 166—42 |

CHARLES E. O'CONNELL, *Primary Examiner.*

C. H. GOLD, *Examiner.*

S. J. NOVOSAD, *Assistant Examiner.*